July 4, 1961

R. LAPSLEY 2,990,591

METHOD AND APPARATUS FOR MOLDING A CORE

Filed Dec. 16, 1957

INVENTOR.
ROBERT LAPSLEY
BY
Kenneth C. Witt
ATTY.

July 4, 1961 R. LAPSLEY 2,990,591
METHOD AND APPARATUS FOR MOLDING A CORE
Filed Dec. 16, 1957 4 Sheets-Sheet 2

INVENTOR.
ROBERT LAPSLEY
BY Kenneth C. Witt
ATTY.

July 4, 1961
R. LAPSLEY
2,990,591
METHOD AND APPARATUS FOR MOLDING A CORE
Filed Dec. 16, 1957
4 Sheets-Sheet 3
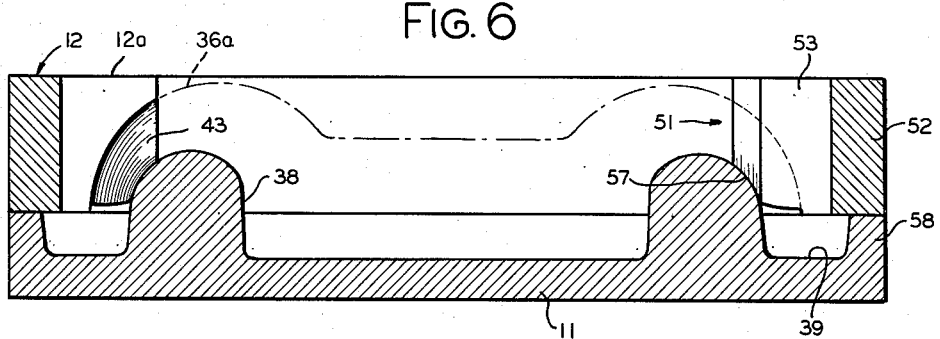
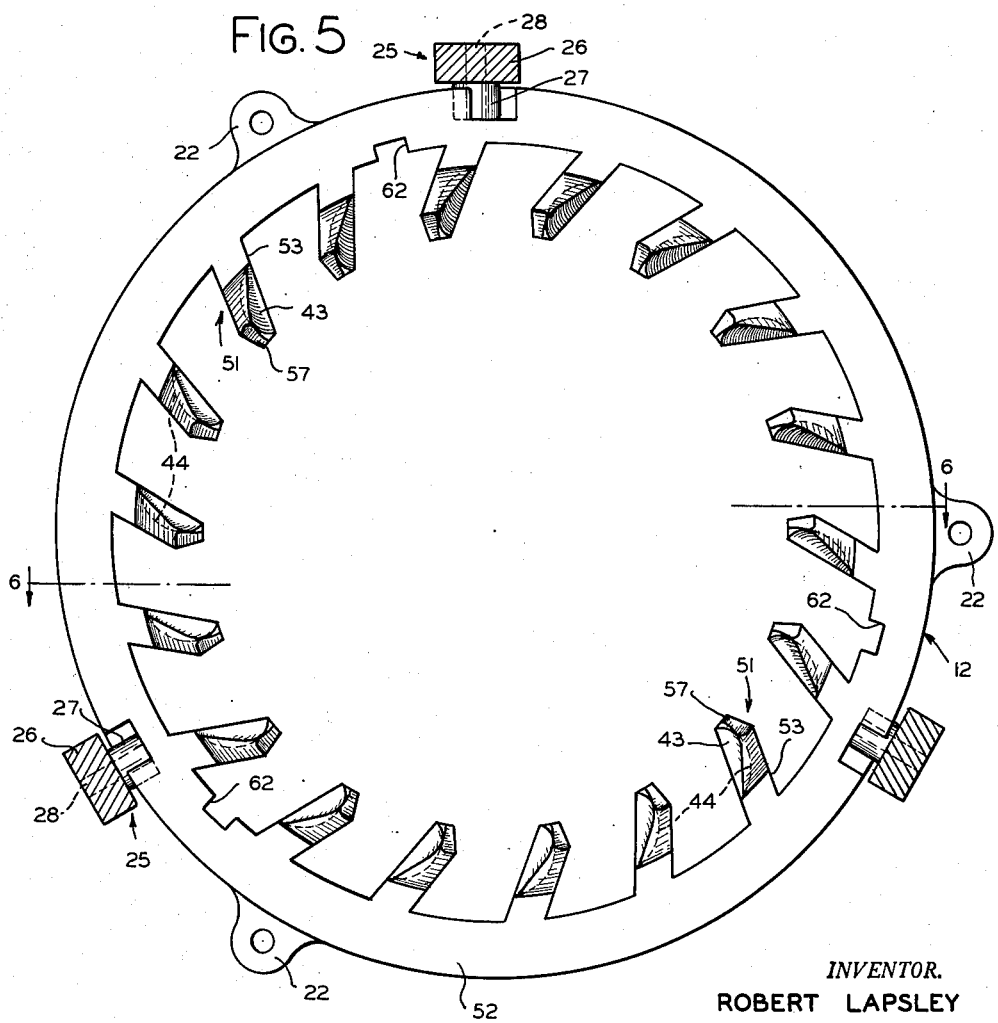
INVENTOR.
ROBERT LAPSLEY
BY Kenneth C. Witt
ATTY.

United States Patent Office 2,990,591
Patented July 4, 1961

2,990,591
METHOD AND APPARATUS FOR MOLDING A CORE
Robert Lapsley, Berrien Springs, Mich., assignor to Clark Equipment Company, a corporation of Michigan
Filed Dec. 16, 1957, Ser. No. 702,892
16 Claims. (Cl. 22—13)

The present invention relates to a method and apparatus for molding a core which may be used in the casting of parts having back-drafts.

Bladed or vaned rotor wheels such as are employed in hydraulic torque converters have been difficult to form in a single casting by the use of prior methods because of the complex contour of the vanes. Ordinarily, the vanes on such wheels are supported either on a hub or a rim or, in some cases, between a hub and a rim. In casting the complete wheel, one or more core members having cavities therein conforming to the desired vane configurations are employed and the hub and rim or, in some cases, one or the other, are cast integrally with the vanes. A principal difficulty which has previously been encountered in using this method of casting bladed wheels has been the initial formation of the core. In accordance with one prior art technique, multiple part cores are employed but such core parts are difficult to assemble and, in addition, the finished product is characterized by the presence of a large number of burrs or projections which must subsequently be removed. Accordingly, a one-piece core is preferable.

In accordance with one prior art method of making a one-piece core for the vanes of rotor wheels, there is employed a heat disposable pattern which is melted and removed from the core in a liquid state after the core has been hardened. Since the pattern cannot be re-used, the production cost is relatively high. In accordance with another prior art technique, the vanes are especially designed to permit unscrewing of the pattern from the casting in a die casting process. However, it is preferable to design the vanes for optimum performance rather than for simplicity of manufacture. Accordingly, both of these methods of making bladed rotor wheels leave much to be desired.

Therefore, an object of the present invention is to provide a new and improved method for molding a one-piece core which is later used in a casting process.

Another object of the present invention is to provide a new and improved core box for molding a one-piece core having back-draft portions.

A further object of the present invention is to provide a new and improved core box for molding a one-piece core which is used to form the vanes in a cast rotor wheel.

Briefly, the above and further objects are realized, in accordance with the present invention, by providing a method and apparatus using a multi-piece core box having a plurality of removable core box elements cooperating to form a one-piece core. Each of these removable core box elements includes pattern portions which interengage with pattern portions on the other removable core box elements to provide complete but composite patterns of the vanes to be cast. Since in most cases the vanes designed for use in torque converters include certain portions having back-drafts therein, and other portions not having back-drafts, in order to facilitate removal of the vane patterns from a one-piece molded core without damage either to the core or to the patterns, at least one of the core box elements includes patterns having back-drafts and at least one other core box element includes patterns of those portions of the vanes not having back-drafts. Therefore, after the core has been at least partially hardened so as to be self-supporting, the core box element having the patterns devoid of back-drafts may be removed directly from the core and thereafter the core box element having the patterns with the back-drafts may be simultaneously rotated and lifted from the core so that the latter pattern is removed by moving it through the cavity in the core previously occupied by the pattern not having the back-drafts. Although the present invention is particularly suited for use in the molding of cores for casting bladed or vaned rotor wheels, it will be readily apparent to those skilled in the art that by a proper selection of the number of removable core box elements and the portions of the pattern to which these elements correspond, a core for almost any complex configuration may be readily molded in a single piece.

The invention, both as to its organization and method of operation, together with further objects and advantages thereof, will best be understood by reference to the following description and claims, taken in connection with the accompanying drawings, in which:

FIG. 5 is a bottom plan view of the intermediate core box element;

FIG. 6 is a conventional, full sectional, elevational view of the element of FIG. 5 shown assembled upon the core box base.

Figure 1:
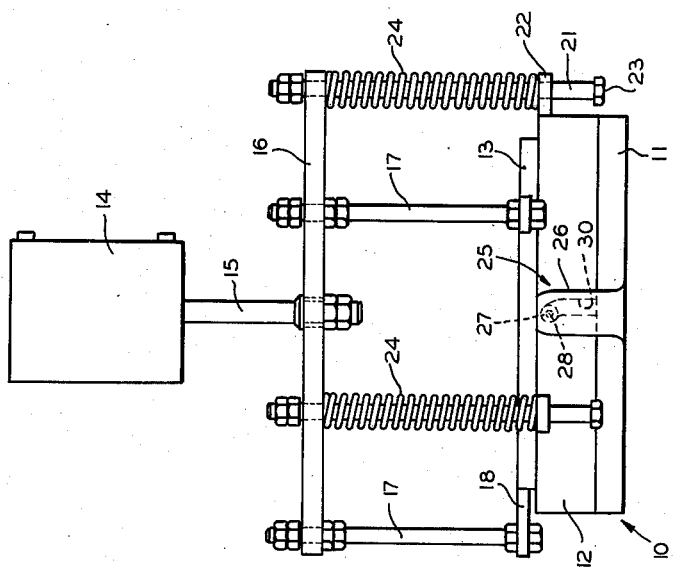
FIG. 1 is a somewhat schematic, elevational view of core molding apparatus embodying the present invention.

Referring now to drawings, and particularly to FIG. 1 thereof, a multiple piece core box 10 is there shown comprising as its principal parts a base member 11 upon which is supported two removable core box members or elements 12 and 13. As more fully described hereinafter in connection with the other figures of the drawings, the core box elements 12 and 13 include interfitting pattern portions about which the core material is induced during a molding process to form a one-piece core having cavities therein which conform to the desired vane configuration. The core box element 13 which, as shown, is disposed above the core box element 12 includes only patterns which are devoid of back-drafts so that after the core material has become sufficiently firm to be self-supporting, the element 13 may be moved along a linear path upwardly from the base 11 thereby to withdraw the associated pattern portions from the core. This lifting of the element 13 from the base member 11 may be effected by means of a hydraulic motor 14 which is connected through a suitable linkage to the core box element 13.

Considered in greater detail, the motor 14 includes a vertically movable, reciprocatory piston or draw rod 15 which is connected to the center of a cylindrical disc 16. A plurality of draw rods 17 are connected between the disc 16 and a plurality of apertured ears or lugs 18 on the core box element 13. Accordingly, as the hydraulic motor 14 is actuated to raise the rod 15 from the position in which it is shown in FIG. 1, the core box element 13 is lifted away from the base member 11.

In accordance with an important aspect of the present invention, the removable core box element 12 includes patterns which conform to the portions of the vanes which include back-drafts. Therefore, the patterns on the core box element 12 cannot be lifted directly out of the core since such movement would result in damage either to the core or to the patterns on the element 12. However, the patterns on the removable core box element 13 are so selected that after the core box element 13 has been removed from the base 11 the patterns on the core box member 12 may be rotated into the cavities in the molded core previously occupied by the patterns on the element 13 simultaneously with the lifting of the removable core box element 12 away from the base member 11 on which the molded core is supported. This simultaneous lifting and rotation of the core box element 12 to withdraw the associated patterns from the molded core can be accomplished through the use of the motor 14 and a very simple linkage so that the motor 14 can be employed for removing both of the core box elements 12 and 13 from the base member 11. However, it will be understood that in other applications different types of motion may be more desirable such as, for example, rotation of the core element 12 before it is lifted. In accordance with the present invention, a plurality of draw rods 21 are connected between the disc 16 and a plurality of lugs 22 which protrude laterally from the periphery of the element 12 at equally spaced intervals such as, for example, at 120 degree intervals. In order to provide a lost motion connection between the disc 16 and the core box element 12 so that continued operation of the motor 14 first lifts the core box element 13 to withdraw the associated patterns from the mold and thereafter lift the core box element 12 away from the base 11, the draw rods 21 are substantially longer than the draw rods 17 so that the heads 23 at the bottoms of the rods 21 do not engage the lower faces of the lugs 22 until the patterns on the core box element 13 are fully clear of the molded core. Thereafter, continued upward movement of the piston rod 15 causes the core box element 12 to be moved along a predetermined path away from the base 11. During the initial movement of the core box element 13, the core box element 12 is held in engagement with the base 11 so as to be fixedly positioned in the molded core in order to prevent damage. This is accomplished by means of a plurality of coil springs 24 which are interposed between the lugs 22 and the disc 16 and which, as shown in FIG. 1, are at least partially compressed when the core box 10 is completely assembled so that as the piston rod 15 initially moves in an upward direction, the springs 24 expand in order to continually press the core box element 12 against the base 11 until the heads 23 on the draw rods 21 engage the lugs 22. Thereafter, continued upward movement of the piston rod 15 lifts the core box element 12.

Figure 2:
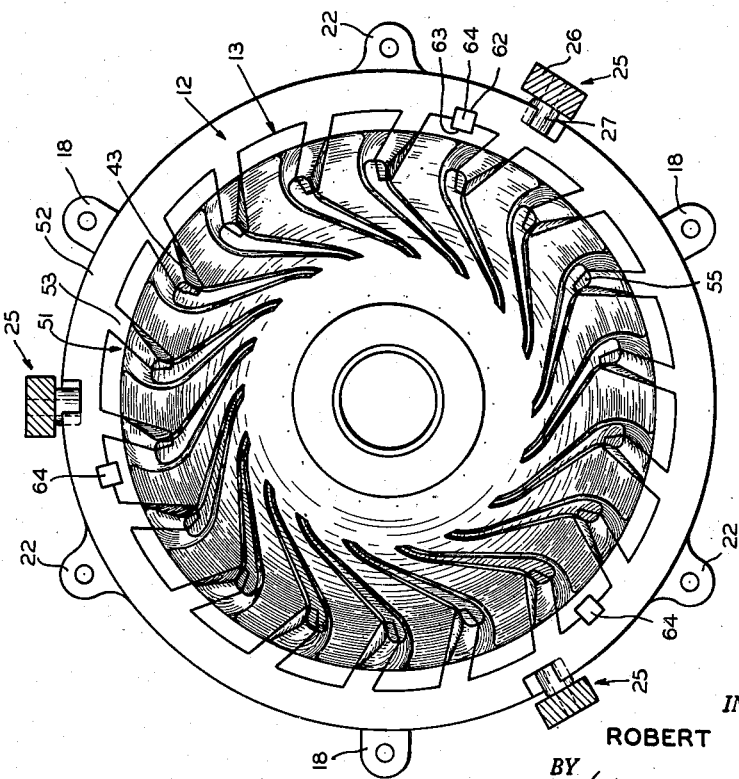
FIG. 2 is a bottom plan view of the removable core box elements in the apparatus of FIG. 1, with the principal part of the base omitted, showing the elements in assembled relationship.

In accordance with an important aspect of this invention cam means 25 are provided for guiding the core box element along such an upward path that as the core box element 12 is lifted away from the base 11 the patterns on the element 12 move into the cavities in the molded core which were previously occupied by the patterns on the core box element 13 thereby to enable removal of the element 12 from the base 11 without damage to the molded core. As best shown in FIGS. 1, 2 and 5, the cam means 25 comprises a plurality of upstanding posts 26 which are disposed on the base member 11 adjacent to the periphery of the core box element 12. Each of the posts 26 rotatably supports a cylindrical roller 27 which is mounted on a roller shaft 28 journalled in the post 26. In the illustrated embodiment of the invention and as best shown in FIG. 2 of the drawings from which all of base 11 has been omitted except the posts 26, three of the posts 26 are provided at 120 degree spaced apart locations and the core box element 12 is provided with three identical cam channels 30 for respectively accommodating the rollers 27. The upper portion of the channels 30 are curved and the lower portions are vertical so that as an upward force is initially exerted on the core box member 12 it rotates in a counterclockwise direction as viewed from the bottom looking upward in FIG. 1, thereby to rotate the patterns on the core box element 12 simultaneously with the withdrawal of the latter core box element away from the base 11. Accordingly, the patterns on the element 12 initially move in a substantially helical path as the element 12 is moved away from the base 11. The exact configuration of the cam channels 30 is, of course, dependent upon the particular shape of the patterns provided on the core box elements 12 and 13. As indicated above, however, it is preferable to so select the patterns used on the elements 12 and 13 that simultaneous withdrawal and rotation of the element 12 may be employed to remove the back-draft pattern from the molded core since this enables the use of relatively simple apparatus using a single motor 14 for removing both of the core box elements 12 and 13 from the molded core.

Figure 4:
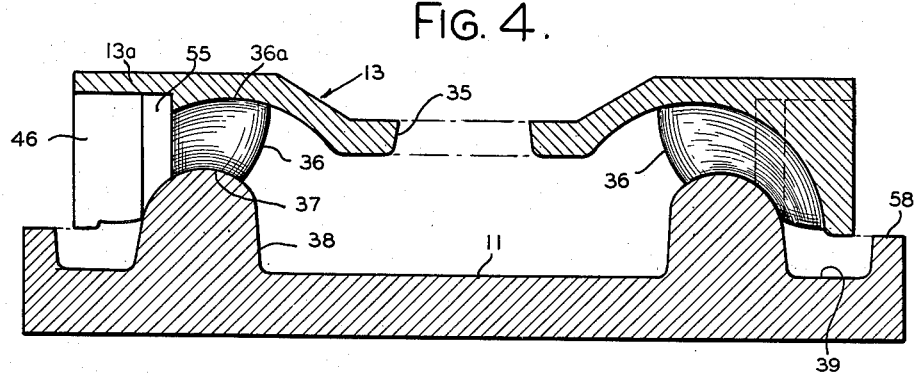
FIG. 4 is a conventional, full sectional, elevational view of the element of FIG. 3 shown assembled upon the base of the core box.
Figure 3:
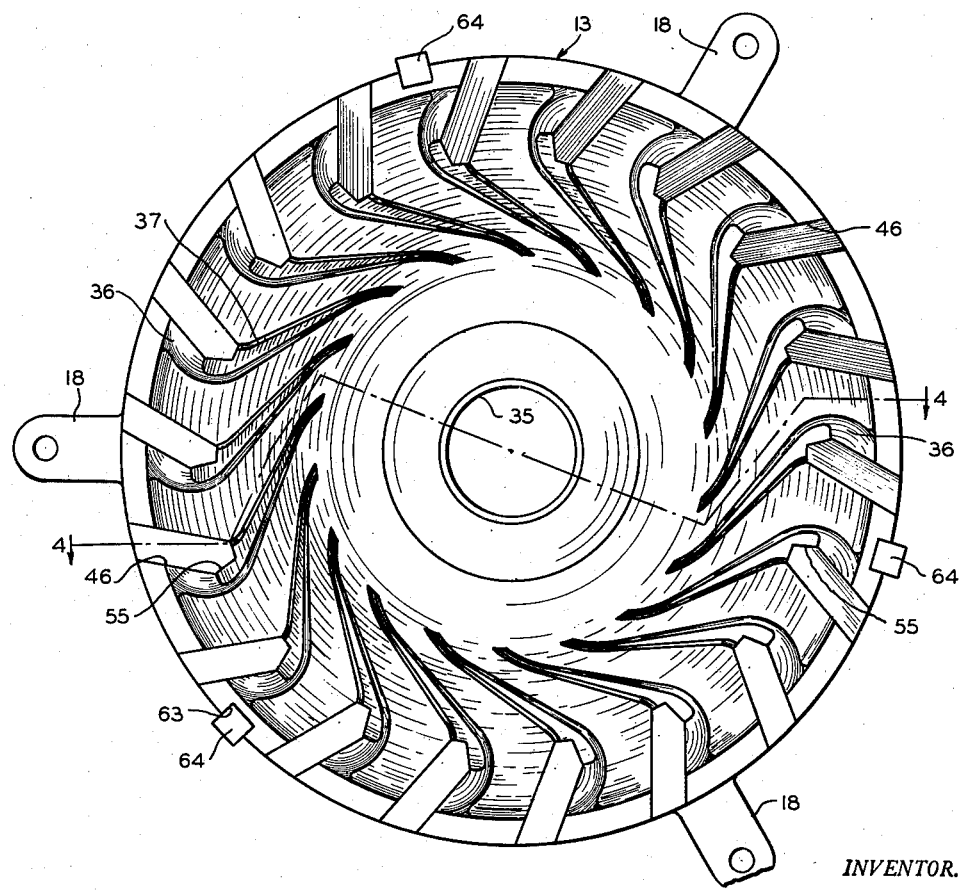
FIG. 3 is a bottom plan view of the upper or cover core box element.

Referring now to FIGS. 3 and 4 for a more detailed description of the removable core box element 13, as there shown, the element 13 constitutes the cover portion of the core box assembly 10 and includes a central aperture 35 of generally conical configuration through which the core material is induced into the core box during the molding of a core. As shown, a plurality of pattern portions 36 depend from the cover part of the core box element 13 and the lower portion of each of the patterns 36 is provided with a concave recess 37 which is adapted to seat upon an annular core locater 38 formed integrally with the upper face of the base 11. The base member 11 is also provided with an annular recess 39 surrounding the core locater 38 and, as best shown in FIG. 4, the outer diameter of the recess 39 is greater than the outer diameter of the core box element 13 so that when the core material is induced through the aperture 35 into the core box it may fill the annulus 39 beneath the lower external edges of the patterns 36. Each of the patterns 36 conforms to portions of the respective vanes in the finished rotor wheel which are devoid of back-drafts so that as described hereinbefore when the hydraulic motor 14 is operated to lift the core box element 13 from the base 11, the patterns 36 may be directly withdrawn from the mold without damage. Since, however, certain portions of the vanes in the completed rotor wheel include back-drafts, the core box element 12, which may be rotated during the lifting thereof, includes the vane pattern portions having the back-drafts.

Therefore, referring to FIGS. 5 and 6, it may be seen that the core box element 12 includes a plurality of vane pattern portions 43 which include the undercut or back-drafted portions indicated by the dotted lines 44. When the core box is assembled, the patterns 43 on the element 12 fit into or engage the patterns 36 on the element 13 in such manner that the two sets of patterns cooperate to provide a plurality of vane patterns each of which is composite in nature and exactly conforms to the shape of the vanes in the completed rotor wheel. While the particular configuration of the patterns 36 and 43 will vary with the desired shape of the vanes to be cast, it is important that each of the patterns 36 constitute such a portion of the complete vane that the patterns 43 may be moved into the cavities in the core vacated by the patterns 36 when the latter are removed from the core.

In order to facilitate the accurate alignment of the core elements 12 and 13 so that the pattern members 43 and 36 are properly interfitted to provide the desired vane pattern, the core box element 13 is provided with a plurality of keyways or guide channels 46, one channel 46 being provided for each pattern 36. Each of the keyways 46 extends from the periphery of the core box element 13 a predetermined distance toward the center of the element 13 and into a respective one of the patterns 36. Each keyway opens to the bottom of the core box element 13 and extends vertically only partially through the latter element.

Referring to FIGS. 5 and 6, the core element 12 comprises patterns 43 which are secured to or formed integrally with the ends of respective ones of a plurality of inwardly directed arms 53 formed on a cylindrical supporting ring 52. The arms 53 and the patterns 43 cooperate to form inwardly directed protrusions identified by reference numeral 51. The arms 53 of the protrusions 51 constitute guide blocks which are receivable within the keyways 46 in the core box element 13.

In accordance with the present invention and as best shown in FIG. 2, the protrusions 51 on the core box element 12 fit exactly into the guide channels 46 so that the surfaces of the patterns 43 lie flush with the corresponding surfaces of the associated ones of the patterns 36 when the core box 10 is assembled. Also, for improved alignment of the patterns 36 and 43, the surface of demarcation 55 between the patterns 36 and the patterns 43 is slanted, although it will be understood that curved surfaces or squared ends on pattern portions 36 could be provided.

As shown in FIG. 6, the patterns 43, like the patterns 36, are provided with a concave recess 57 in the lower portion thereof for resting on the annular core locater 38 of the base member 11, while the bottom surface of the outer ring portion 52 of element 12 seats upon an upstanding annular rim 58 on the base 11 to provide a seal between the base member 11 and the core box element 12.

Although the guide portions 53 cooperate with the keyways 46 to insure proper relative motion between the core box elements 12 and 13 when the element 13 is initially removed, where necessary, a plurality of straight guide slots 62 may be provided in the inner wall of the ring 52. Similarly, the cover core box element 13 may be provided with a like number of straight vertically disposed guide slots 63 and, as best shown in FIGS. 2 and 3, a plurality of rectangular pins 64 may be driven into the slots 63. The pins 64 extend laterally from the slots 63 and are accommodated within the slots 62 when the parts are assembled, thereby to insure accurate alignment of the patterns in the core box elements 12 and 13. It will be understood that the additional indexing means comprising the slots 62 and 63 and pins 64 may be omitted if sufficient accuracy is obtained through the coaction between the guide arms 53 and the keyways 46.

Although the operation of the core box 10 will be clear inasmuch as it has been described in regard to its use, nevertheless, in order to insure a full and complete understanding of the present invention, a brief description of the method of using it to mold a one-piece core may be helpful. Accordingly, in order to employ the core box 10 to mold a core element including the configurations of a plurality of vanes having back-draft portions, the surfaces of the core box are first thoroughly cleaned and oiled and then the elements are assembled in the manner shown in FIG. 1.

The core locating annulus 38 insures relatively accurate alignment of the core box elements 12 and 13 on the base 11 as well as with respect to one another and a more accurate alignment of the vane patterns 36 and 43 is assured by the reception of the arms 53 in the guide channels 46 and by the aligning pins 64 when the latter are used. With the core box 10 thus assembled, the core material is introduced into the core box through the aperture 35 in the cover element 13 until the entire cavity within the core box 10 is filled. As is well known in the art, the core material may consist of core sand mixed with a suitable binding material, aerated plaster, sand and plaster, or any other suitable core material. After all of the voids in the core box 10 have been filled, the core material is permitted to harden and, if desired, this hardening may be accelerated by applying heat to the core box. When the core material has become firm enough to maintain its shape without the support of the core box, the motor 14 is energized to first lift the removable cover element 13 away from the base 11 thereby withdrawing the vane patterns 36 from the molded core. Shortly after the patterns 36 are free of the core, the heads 23 on the draw rods 21 engage the lugs 22 on the core box element 12 in order to cause rotation of the core box element 12 simultaneously with the withdrawal thereof from the base 11. The exact path of movement of the patterns 43 is determined by the shape of the cam groove 30, this shape being such as to move the patterns 43 into the cavities in the molded core vacated by the patterns 36. This movement of the patterns 43 through the unoccupied portions of the core continues in accordance with the path determined by the cam channels 30 until the patterns 43 are clear of the core. The core box elements 12 and 13 and the parts to which they are connected may then be removed by suitable means after which the molded core is fully hardened before removal from the base member 11. If necessary, any thin fins which may project above the molded surfaces as a result of the narrow cracks between the core box elements 12 and 13 may be smoothed off before using the core in casting.

Figure 7:
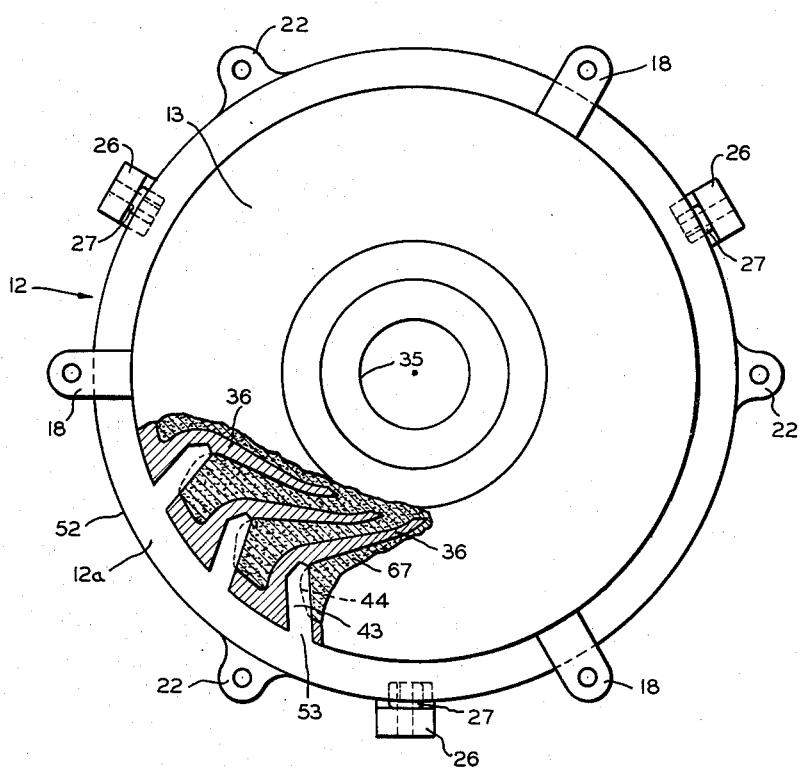
FIG. 7 is a top plan view of the core molding apparatus with a portion of the upper core box element broken away.

FIGURE 7 illustrates how core box element 13 may be lifted vertically and shows that it is necessary that element 13 be thus lifted and removed before core box element 12 may be removed by simultaneously "twisting" and lifting it. FIGURE 7 is a top view in which a part of the upper cover portion 13a (see FIGURE 4) of element 13 has been omitted down to the junction 36a (see FIGURE 4 for this also) between the cover portion 13a and the depending pattern portions 36. This junction 36a is also illustrated by the dot-dash line in FIGURE 6. This is somewhat below the level of the upper surface 12a (see FIGURE 6) of the core box element 12. Upper surface 12a of the core box element 12 indicates the upper surface of the outer ring 52 of this element as well as the upper surface of the inwardly projecting guide portions 53 and pattern portions 43 which are integral with portions 53. In FIGURE 7 the core box is shown as filled with core material 67 which may be any of the core materials mentioned hereinbefore. Inasmuch as pattern portions 36 taper to a narrower cross-section from top to bottom as illustrated in the bottom views of FIGURES 2 and 3, it will be apparent that core element 13 may be lifted in a direction normal to the plane of FIGURE 7. Until core box element 13 has been so removed, core box element 12 could not be moved because the core material 67 extends into the undercut or backdraft portion along the counterclockwisemost surface of each pattern portion 43 as illustrated by the dashed lines 44. However, when element 13 has been removed, core box element 12 then may be removed through a generally helical path clockwise and then upwardly to remove it from the core box assembly without damaging the core 67. Such movement of core box 12 is accomplished by the action of the cam grooves 30 on the rollers 27 as explained previously.

There is thus provided in accordance with the present invention apparatus which may be used in a simple and inexpensive manner to form a one-piece core for use in the casting of vaned rotor wheels having back-drafted portions. Similar apparatus constructed in accordance with the present invention may be used in the casting of many other articles having relatively complex surfaces of curvature including back-drafts.

While a particular embodiment of the invention has been shown, it will be understood, of course, that it is not intended that the invention be limited thereto since modifications may be made and it is, therefore, contemplated by the appended claims to cover any such modifications as fall within the true spirit and scope of the invention.

Having thus described the invention, what is claimed as new and desired to be secured by Letters Patent is:

1. A core box for molding a one-piece core used to form the vanes in a plural vane cast rotor wheel, certain portions of the vanes including back-drafts, said core box comprising a base, a first circularly arranged core box element removably disposed on said base, a second circularly arranged core box element removably disposed on said base in coaxial relation to the said first core box element, each of said core box elements including a plurality of pattern portions corresponding in configuration respectively to a portion of each of the vanes, alignment means at least partially disposed on said core box elements for positioning the core box elements so that said pattern portions of the core box elements interfit with one another respectively to provide a plurality of composite pattern portions corresponding in configuration to the desired vanes, the said pattern portions of the first core box element being free of back-drafts, the said pattern portions of the second core box element including back-drafts, and the said core box elements being so adapted and arranged that during removal the pattern portions with back-drafts on the said second element are moved through spaces previously occupied by said pattern portions without back-drafts on said first element.

2. A core box for molding a one-piece core used to form the vanes in a plural vane cast rotor wheel, certain portions of the vanes including back-drafts, said core box comprising a base, a first circularly arranged core box element removably disposed on said base, a second circularly arranged core box element removably disposed on said base in coaxial relation to the said first core box element, each of said core box elements including a plurality of pattern portions corresponding in configuration respectively to a portion of each of the vanes, alignment means at least partially disposed on said core box elements for positioning the core box elements so that said pattern portions of the core box elements interfit with one another respectively to provide a plurality of composite pattern portions corresponding in configuration to the desired vanes, the said pattern portions of the first core box element being free of back-drafts, the said pattern portions of the second core box element including back-drafts, means for removing said first core box element from said base along a substantially linear path, and means for removing said second core box element from said base along a substantially linear path while simultaneously rotating said second core box element, whereby during removal of the said core box elements the pattern portions with back-drafts on the said second element are moved through spaces previously occupied by said pattern portions without back-drafts on said first element.

3. A core box for molding a one-piece core used to form the vanes in a cast rotor wheel, certain portions of the vanes including back-drafts, said core box comprising a base, a pair of circularly arranged core box elements removably disposed in coaxial relation on said base, the said elements being removable sequentially by movement normal to said base, each of said core box elements including pattern portions corresponding in configuration to respective pattern portions of said vanes, alignment means at least partially disposed on said core box elements for positioning said core box elements in said core box so that said pattern portions of said core box elements interfit with one another to provide composite pattern portions corresponding in configuration to the desired vanes, said pattern portions of one of said core box elements being free of back-drafts, and said pattern portions of the other core box element including back-drafts, means for removing said one core box element from said base along a substantially linear path, and means for separately removing said other core box element from said base along a substantially linear path while simultaneously rotating said second core box element thereby to remove said back-drafted portion from a molded core without damage to said core, the last mentioned removing means comprising interengaging cam and cam follower means respectively disposed on said base and said other core box element.

4. A core box for molding a one-piece core used to form the vanes in a cast rotor wheel, certain portions of the vanes including back-drafts, said core box comprising a base, a pair of circularly arranged core box elements removably disposed in coaxial relation on said base, each of said core box elements including pattern positions corresponding in configuration to respective portions of said vanes, one of said core box elements being a cover member with depending pattern portions, the other of said core box elements being a ring with inwardly protruding pattern portions, alignment means at least partially disposed on said core box elements for positioning said core box elements in said core box so that said pattern portions of said core box elements interfit with one another to provide composite pattern portions corresponding in configuration to the desired vanes, said pattern portions of said one core box element being free of back-drafts, and said pattern portions of said other core box element including back-drafts.

5. A core box for molding a one-piece core used to form the vanes in a cast rotor wheel, certain portions of the vanes including back-drafts, said core box comprising a base, a pair of circularly arranged core box elements removably disposed in coaxial relation on said base, each of said core box elements including pattern portions corresponding in configuration to respective portions of said vanes, one of said core box elements comprising a cover member with depending pattern portions, the other of said core box elements comprising a ring with inwardly protruding pattern portions, alignment means comprising guide slots in the cover member adjacent the pattern portions thereof and key portions on said ring disposed adjacent the pattern portions thereof and receivable in said slots, whereby said pattern portions of said core box elements interfit with one another to provide composite pattern portions corresponding in configuration to the desired vanes, said pattern portions of said one core box element being free of back-drafts and said pattern portions of said other core box element including back-drafts.

6. A core box comprising a base member having an upper surface, an annular core box member adapted to be removably positioned on the said surface, an annular core box element adapted to be removably positioned on said surface in interfitting relationship with said core box member, said core box member having a plurality of pattern portions devoid of back-drafts, said core box element having an equal plurality of pattern portions having back-drafts and arranged to interfit respectively with the said pattern portions on the core box member, and said core box member and said core box element being removable sequentially by movement normal to said base.

7. A core box comprising a base member having an upper surface, an annular core box member adapted to be removably positioned on the said surface, an annular core box element adapted to be removably positioned on said surface in interfitting relationship with said core box member, said core box member including pattern portions devoid of back-drafts, said core box element including pattern portions having back-drafts and arranged to interfit respectively with the said pattern portions on the core box member, interengaging camming means respectively disposed on said core box element and on one of said members, and the said core box member and said core box element being so adapted and arranged that they are removable sequentially by movement normal to the said base and during removal the said pattern portions with back-drafts on the core box element are moved through spaces previously occupied by the said pattern portions without back-drafts on the core box member.

8. A core box comprising a base, and first and second coaxial core box elements removable sequentially by movement normal to said base, said base including seating portions on which said core box elements are supported, said first core box element including a ring having a plurality of protrusions extending inwardly therefrom, said protrusions each having a pattern portion and a guide portion, said second core box element including guide channels in which said guide portions are received and further including a plurality of pattern portions interfitting respectively with the pattern portions of said first core box element thereby to provide a plurality of composite pattern portions.

9. A core box as set forth in claim 8 wherein the pattern portions on one of said core box elements include back-drafts.

10. Apparatus for molding a one-piece core for use in casting a one-piece rotor wheel which includes a plurality of cast vanes, said apparatus comprising a multiple piece core box having a plurality of coaxial removable core box elements, one of said elements including vane patterns having back-drafts, lifting means, a positive connection between said lifting means and one of said elements, a lost motion connection between said lifting means and another of said elements, said connections cooperating with said lifting means to cause sequential lifting of said elements, and means responsive to the operation of said lifting means for causing said element with the back-drafted pattern to rotate about the axis along which it is moved as it is lifted from a core molded about said patterns.

11. Apparatus for molding a one-piece core for use in casting a one-piece rotor wheel which includes a plurality of cast vanes, said apparatus comprising a multiple piece core box having a plurality of coaxial removable core box elements, one of said elements including vane patterns having back-drafts, lifting means, a positive connection between said lifting means and one of said elements, a lost motion connection between said lifting means and another of said elements, said lifting means comprising spring means for resiliently urging said elements apart during the lost motion action of said lost motion connection, said connections cooperating with said lifting means to cause sequential lifting of said elements, and means responsive to the operation of said lifting means for causing said element with the back-drafted pattern to rotate about the axis along which it is moved as it is lifted from a core molded about said patterns.

12. A core box comprising a base member, a first circularly arranged removable core box element mounted on said base, a second circularly arranged removable core box element mounted on said base, the said elements being removable sequentially by movement normal to said base and each element including a plurality of pattern portions arranged to interfit respectively with an equal number of pattern portions on the other element, and upstanding core locating means on said base member engaging said pattern portions on said elements to align said elements with respect to one another and with respect to said base.

13. A core box comprising a base member and a pair of circularly arranged removable core box elements mounted on said base, the said elements being removable sequentially by movement normal to said base, said elements each including a plurality of pattern portions arranged to interfit with an equal number of pattern portion on the other element, said portions each having a concave surface, and semi-toroidal upstanding core locating means on said base member engaging said pattern portions on said elements to align said elements with respect to one another in respect to said base, said locating means having a convex upper surface adapted to engage the said concave surfaces on said pattern portions.

14. A method of forming a one-piece core which is used for casting a rotor wheel having a plurality of integral cast vanes, said method comprising molding said core in a multiple part core box having separate coaxial pattern portions for the back-drafted and non-back-drafted portions of said vanes, partially hardening said core, withdrawing said non-back-drafted pattern portions from said core by axial movement of said non-back-drafted portions, and thereafter removing said back-drafted pattern portions from said core by a combined axial and rotative movement about the axis, whereby said back-drafted pattern portions are moved through the spaces in the core previously occupied by said non-back-drafted portions.

15. A core box for molding a one-piece core, comprising a base and a plurality of core box elements removably disposed on said base in coaxial relationship including at least one element having pattern portions with back-drafts and at least one other element having pattern portions without back-drafts, said elements being removable sequentially by movement normal to said base, and the said core box elements being so adapted and arranged that during removal the said pattern portions with back-drafts are moved through spaces previously occupied by said pattern portions without back-drafts.

16. A method of forming a core which is used in casting an article having a back-drafted portion, comprising forming a multiple part pattern of said article, one of said parts including back-drafts and at least one other of said parts being devoid of back-drafts, molding said core about said pattern, removing said other part from said core, and thereafter withdrawing said one part from said core by moving said one part through the space in the core previously occupied by said other part.

References Cited in the file of this patent

UNITED STATES PATENTS

| | | |
|---|---|---|
| 371,820 | Carr | Oct. 18, 1887 |
| 682,485 | McWane | Sept. 10, 1901 |
| 701,105 | Tolmie | May 27, 1902 |
| 1,378,524 | Clark | May 17, 1921 |
| 1,432,665 | Campbell | Oct. 17, 1922 |
| 2,611,161 | Paul et al. | Sept. 23, 1952 |
| 2,814,082 | Voigt | Nov. 26, 1957 |
| 2,887,744 | Halliday | May 26, 1959 |